Feb. 9, 1965   F. MATHIEU   3,168,993
FILM SELECTING AND PROJECTING DEVICES
Filed April 25, 1962   6 Sheets-Sheet 1

FIG. 1

INVENTOR.
FREDERIC MATHIEU
BY Darby to Darby
ATTORNEYS

Feb. 9, 1965   F. MATHIEU   3,168,993
FILM SELECTING AND PROJECTING DEVICES
Filed April 25, 1962   6 Sheets-Sheet 2

INVENTOR.
FREDERIC MATHIEU
BY Darby & Darby
ATTORNEYS

Feb. 9, 1965  F. MATHIEU  3,168,993
FILM SELECTING AND PROJECTING DEVICES
Filed April 25, 1962  6 Sheets-Sheet 6

INVENTOR.
FREDERIC MATHIEU
BY Darby & Darby
ATTORNEYS

United States Patent Office 3,168,993
Patented Feb. 9, 1965

3,168,993
FILM SELECTING AND PROJECTING DEVICES
Frederic Mathieu, Paris, France, assignor to Compagnie d'Applications Mechaniques à l'Electronique au Cinema et à l'Atomistque (C.A.M.E.C.A.), Courbevoie, Seine, France, a corporation of France
Filed Apr. 25, 1962, Ser. No. 190,031
19 Claims. (Cl. 242—55.13)

The present invention relates to devices for selecting one from a group of films stored on a magazine or drum and projecting the selected film on a screen.

More particularly the invention relates to a means for transferring the film from a supply reel to a takeup reel during projection thereof and for rewinding the film on the supply reel subsequent to projection.

More particularly still the invention relates to means whereby a single rewinding mechanism is provided for the plurality of films which may be projected and wherein the rewinding operation is carried on while a newly selected film is being projected, the rewinding mechanism travelling with the previously projected film and rewinding that film while removed from the projecting station, the rewinding mechanism at the termination of the rewinding operation returning to the projecting station where it is held in readiness for travelling with and rewinding the subsequently projected film.

The machine of this invention is generally similar to that disclosed in my copending application Serial No. 49,770, filed August 15, 1960, now Patent No. 3,098,409, and assigned to the assignee of this application.

As in that application, the machine comprises a magazine or drum on which a plurality of films are mounted, each film being reeled on a supply reel which has a corresponding takeup reel, the pairs of reels being mounted in substantially vertical alignment on the perimeter of a drum so that the films extend vertically between the supply and takeup reels.

The projector is arranged in two parts, the film being threaded automatically in the projector as the two parts are closed. Conversely, when the two parts are opened the film can extend directly from the supply to the takeup real and the drum can be rotated about its vertical axis to move a desired film into the projecting position. The rewinding mechanism is, as indicated above, mounted within the drum and moves about the drum axis being carried with the drum to rewind the film while the film is removed from the projecting position and moving independently of the drum to return to the projecting position after the rewinding operation is completed.

It is an object of the invention to provide an improved film projecting mechanism in which one of a plurality of stored films may be selected for projection, projected and rewound while a second of the stored films subsequently selected is being projected.

It is another object of the invention to provide such a mechanism in which after the rewinding of a particular film has been completed, the rewinding mechanism is returned to the projecting station in readiness to rewind a film then being projected.

It is a further object of the invention to provide such a rewinding mechanism in which a single power source causes the rewinding of a film and the return of the rewinding mechanism to the projecting position.

It is a still further object of the invention to provide a rewinding mechanism which is locked for movement with the magazine or drum when that magazine moves to place a film in the projecting position and which is unlocked and driven to the projecting position upon the completion of the rewinding operation under drive of the same power source as was utilized for rewinding.

It is a still further object of the invention to provide means controlled by the film to initiate the rewinding operation and a separate film controlled means for terminating the rewinding operation and initiating the return to projecting position.

Other objects and features of the invention will be apparent when the following description is considered in connection with the annexed drawings, in which.

FIGURES 3a and 3b are partial elevations which taken together, illustrate the rewinding mechanism together with the controlling mechanism which is mounted on the control arm of FIGURE 2 and which controls the operation of the rewinding mechanism shown in FIGURE 3b. FIGURES 3a and 3b show the position of the parts when the film projection has just been completed and the rewinding operation started;

Figure 1:
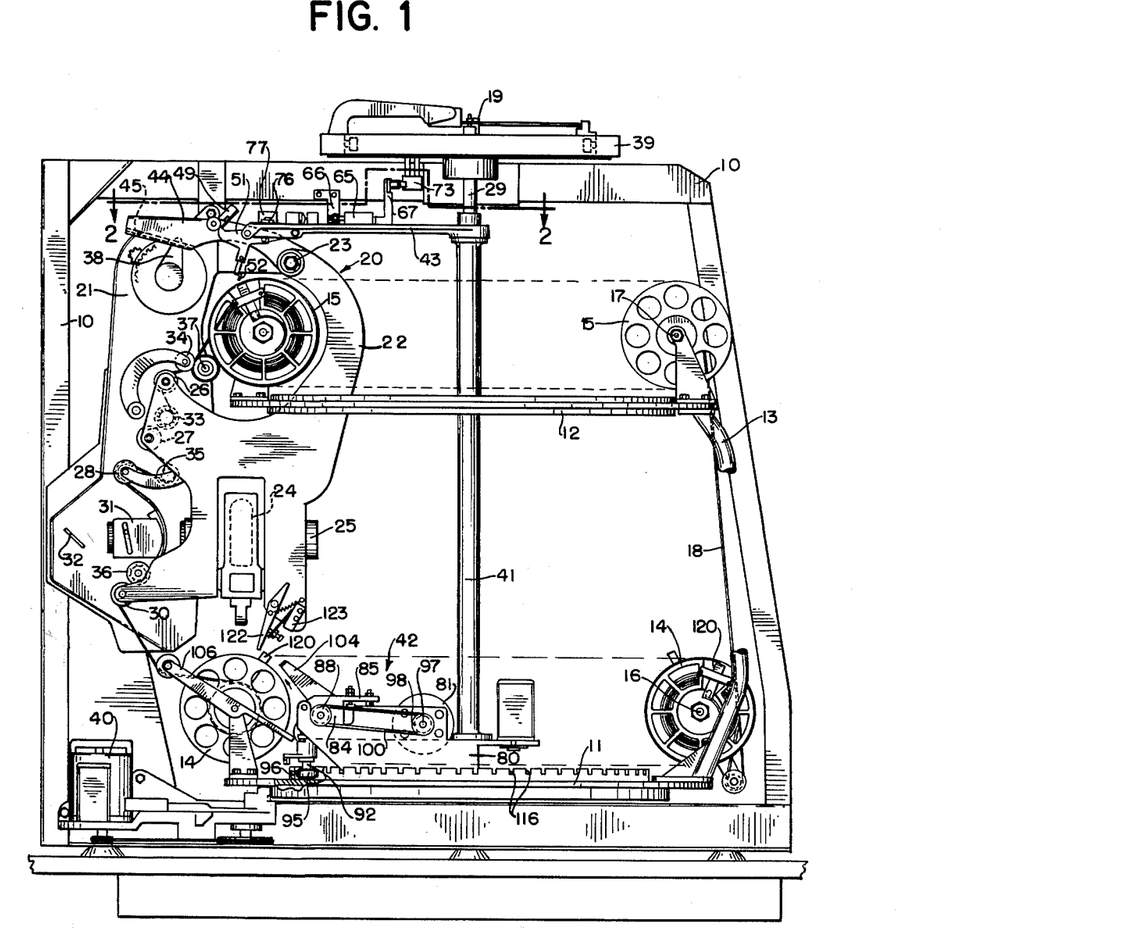
FIGURE 1 is a side elevational view of a machine in accordance with my invention showing the general organization of this machine, certain of the film supply and takeup reels being omitted in order that the projector and rewind mechanisms may be more clearly shown.

Referring now to the drawings and particularly to FIGURE 1 thereof, there is shown at 10 a framework on which a lower disk 11 and an upper disk 12 are rotatably mounted, these disks being joined by a plurality of vertically extending struts or spacers 13 forming a drum structure on which the film supply reels 14 and film takeup reels 15 are mounted for rotation on respective horizontal axes 16 and 17.

Placed to cooperate with that one of the films 18 which is in the projection position, is a projector 20 which includes the two portions 21 and 22, portion 21 being fixed to the frame 10, the portion 22 being pivoted on the portion 21 at the point 23. Portion 22 of the projector carries the light source 24 and a portion of the lens system which is in the usual manner housed within the barrel 25. Portion 22 of the projector also carries a plurality of idler rollers 26, 27, 28 and 30. The portion 21 of the projector 20 carries a portion of the projecting lens system housed in the barrel 31 together with an oscillating mirror 32, two drive sprockets 33 and 36, two idler rollers 34 and 35, and a takeup reel feed roller 37. Also mounted on the stationary portion of the projector, although not strictly a part thereof, is a crank 38 which controls the pivotal movement of projector portion 22, thus opening and closing the projector at selected intervals and permitting the rotation of the drum formed of the parts 11, 12 and 13 to take place.

The rotation of the drum is controlled by the action of a drive motor 40 which is mounted on the frame 10 and which has a roller (not shown) which bears against the periphery of the lower plate or disk 11 and serves by its frictional engagement to rotate that drum.

Mounted upon a shaft 41, coaxial with the axis of the tape drum but rotatable independently of that drum, is a rewinding mechanism generally designated 42 which, as will hereinafter appear, is caused to move with the drum, by virtue of a locking mechanism, during movement of the drum in one direction when a selected film is moved into the projecting position and which moves independently of the drum in the opposite direction when the rewinding operation has been completed. Fixed to the shaft 41 is a control arm 43 which thus moves with the rewinding mechanism at all times. The arm 43 carries microswitches and latching mechanism which, as will hereinafter be described, control the energization and deenergization of the rewinding mechanism cooperating with the projector opening and closing to assure that the rewinding will start immediately upon the completion of projection of a particular film and that the rewinding mechanism will return to the projection position after the film previously projected has been rewound.

Figures 2, 6:
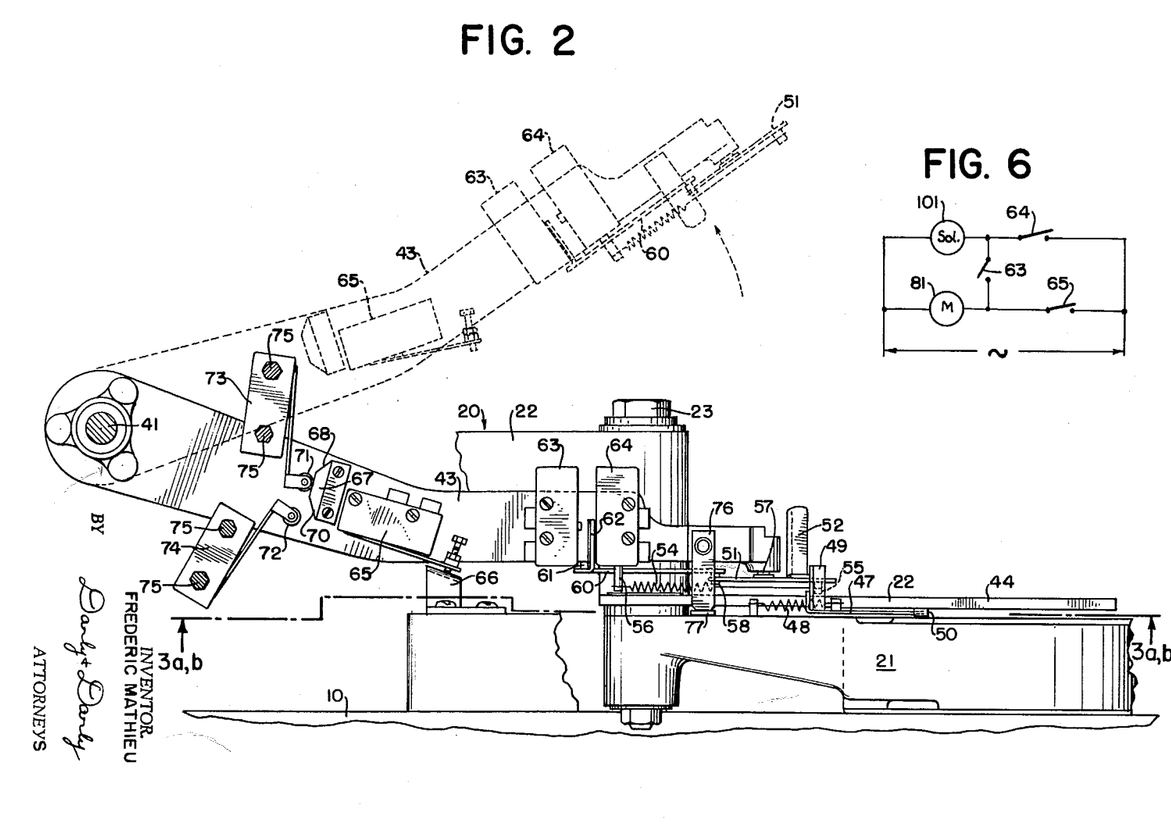
FIGURE 2 is a top plan view of the control arm of FIGURE 1, this view being taken on the plane of the line 2—2 of FIGURE 1.
FIGURE 6 is a schematic wiring diagram of the rewinding mechanism and controls therefor showing the electrical interconnections thereof.

Referring now to FIGURE 2, the various control switches and mechanisms mounted on the control arm 43 will be briefly described since the complete description can best be given in connection with the operation of the machine which will follow thereafter.

As shown in FIGURE 2, the movable portion 22 of the projector is pivotally mounted upon the pivot 23 which pivot is mounted in the fixed portion of the projector and in turn on the stationary frame 10. Movable with the projector portion 22 is the arm 44 which extends to the right as shown in FIGURE 2 and to the left as seen in FIGURE 1. As indicated in FIGURE 1, arm 44 has a slot 45 formed therein in which a crank pin on the arm 38 moves so that as the crank 38 is rotated the arm 44, and with it the projector portion 22, is caused to pivot about the pivot 23 to open or close the projector. Pivotally mounted on the arm 44 by means of the pivot 46 is a trip 47 (see also FIGURES 3a and 4a) which is urged by a spring 48 into a position in which its upper edge strikes a fixed pin 50 in arm 44. These elements remain in the plane of the projector at all times whereas the arm 43 moves about the vertical axis of the drum with the shaft 41.

Pivotally mounted at the end of arm 43 is a T-shaped member 51, the lower end of which is formed with an L-shaped member 52 bent off therefrom and adapted to cooperate with a takeup reel mounted member 120. A tension spring 54 extends between a pin 55 in one arm of the member 51 and a pin 56 mounted in the arm 43, the spring tension being exerted on a line passing substantially through the pivotal mounting 57 of the T-shaped piece 51 so that that member will be retained in either position after having been compelled to take that position by external means.

Mounted in a slot in the left end of member 51 is a pin 58 extending outwardly from an arm 60 pivotally mounted at 61 on the arm 43. Arm 60 is, in fact, a bell crank member, the upper arm 62 of which is formed with a right angled extension which serves to operate the two microswitches 63 and 64. The microswitches 63 and 64 are of course mounted on the upper surface of the arm 43. Also mounted on the upper surface of the arm 43 is a microswitch 65 which cooperates with a stop member 66 fixed to the frame 10.

Additionally there is mounted on the upper surface of arm 43 a cam 67 which is provided with two camming surfaces 68 and 70 which cooperate respectively with the rollers 71 and 72 of microswitches 73 and 74. The microswitches 73 and 74 are supported in a fixed position from the frame 10 by means of the rods 75. Also mounted on the upper surface of the arm 43 is a stop 76 which cooperates with the fixed projector portion 21 and more specifically with a bumper 77 fixed to that portion.

Figure 3A:
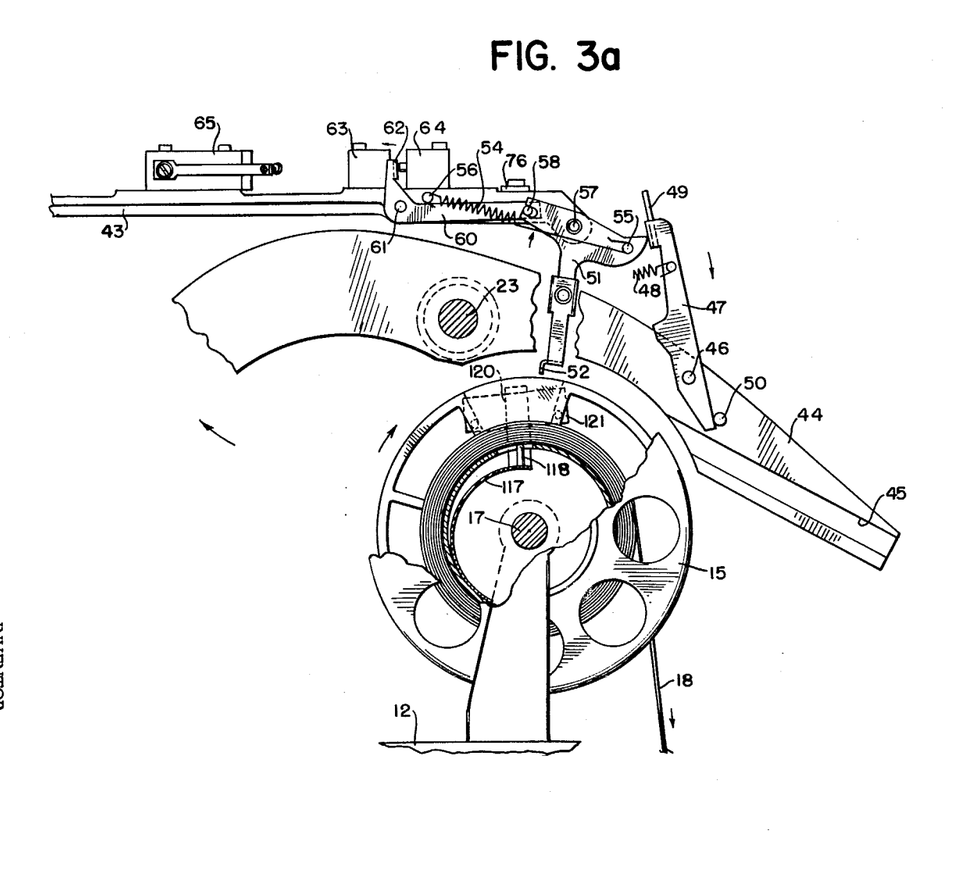
Figure 3B:
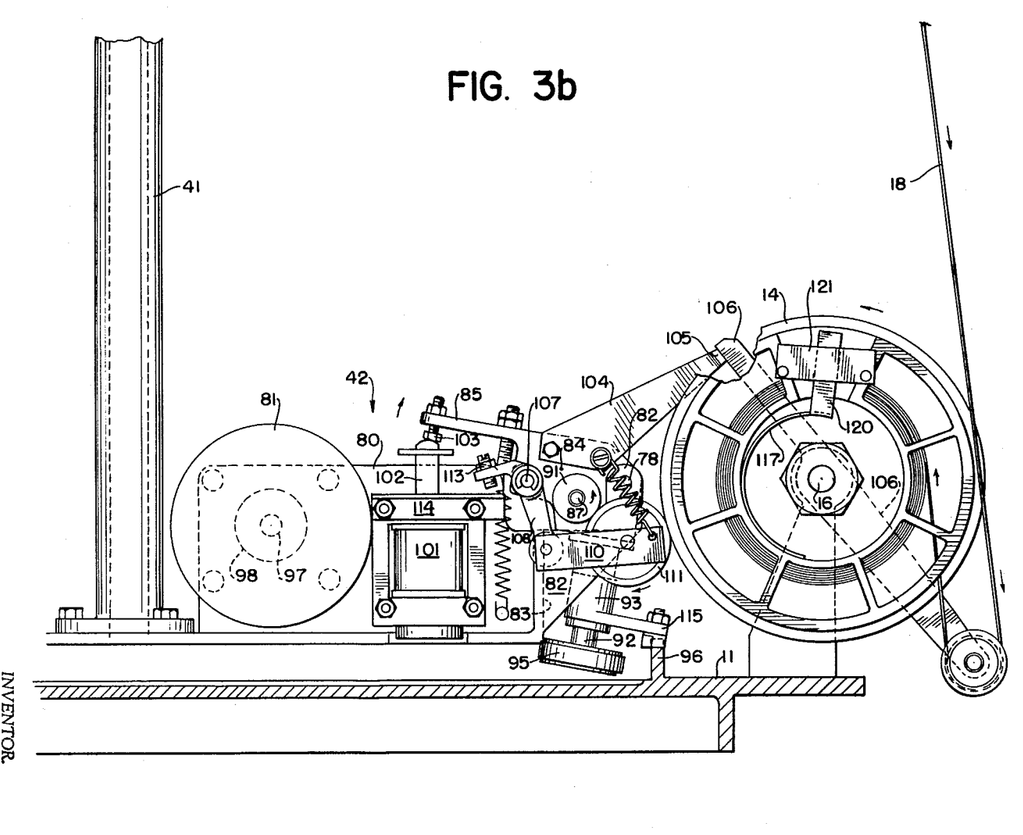
Figure 4A:
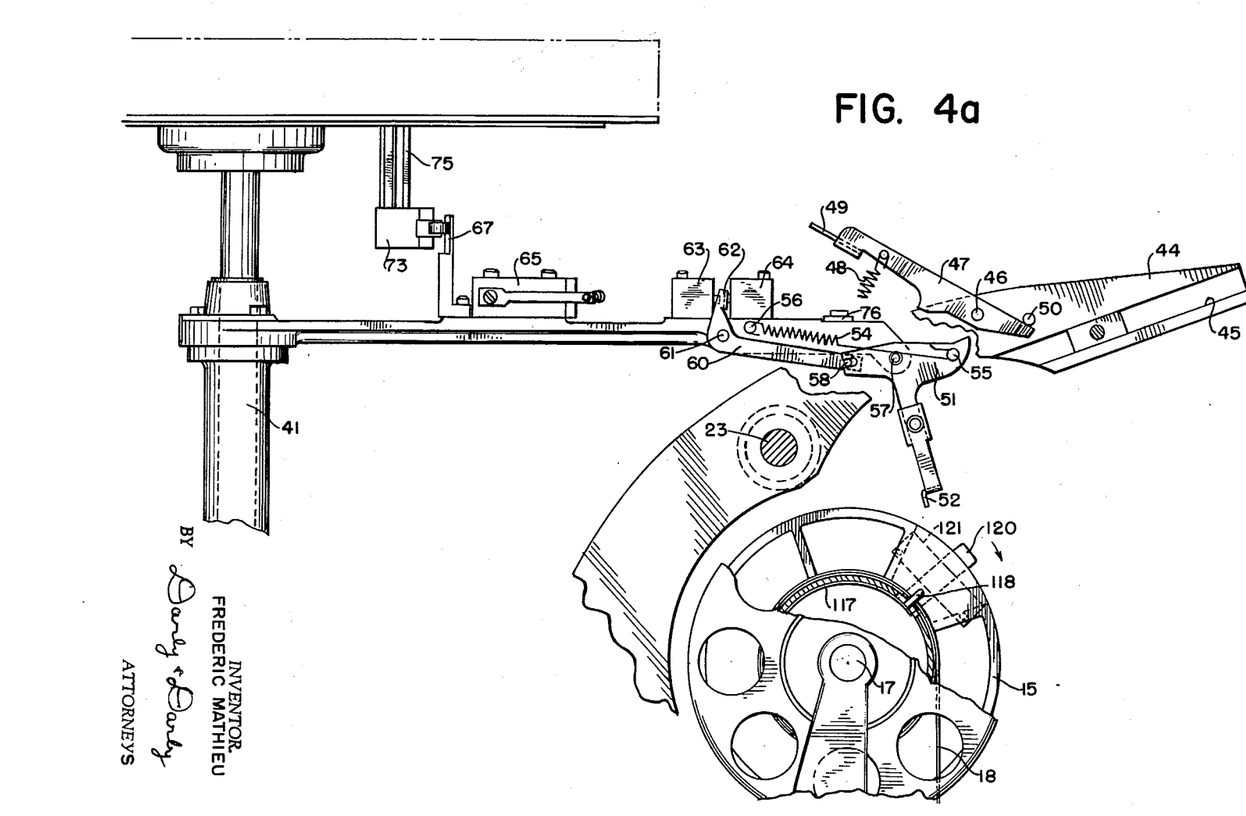
FIGURES 4a and 4b are views similar to FIGURES 3a and 3b and, taken together, show the positions of the parts immediately following the completion of rewinding at a time when the rewinding mechanism is being returned to the projection position.
Figures 4B, 5:
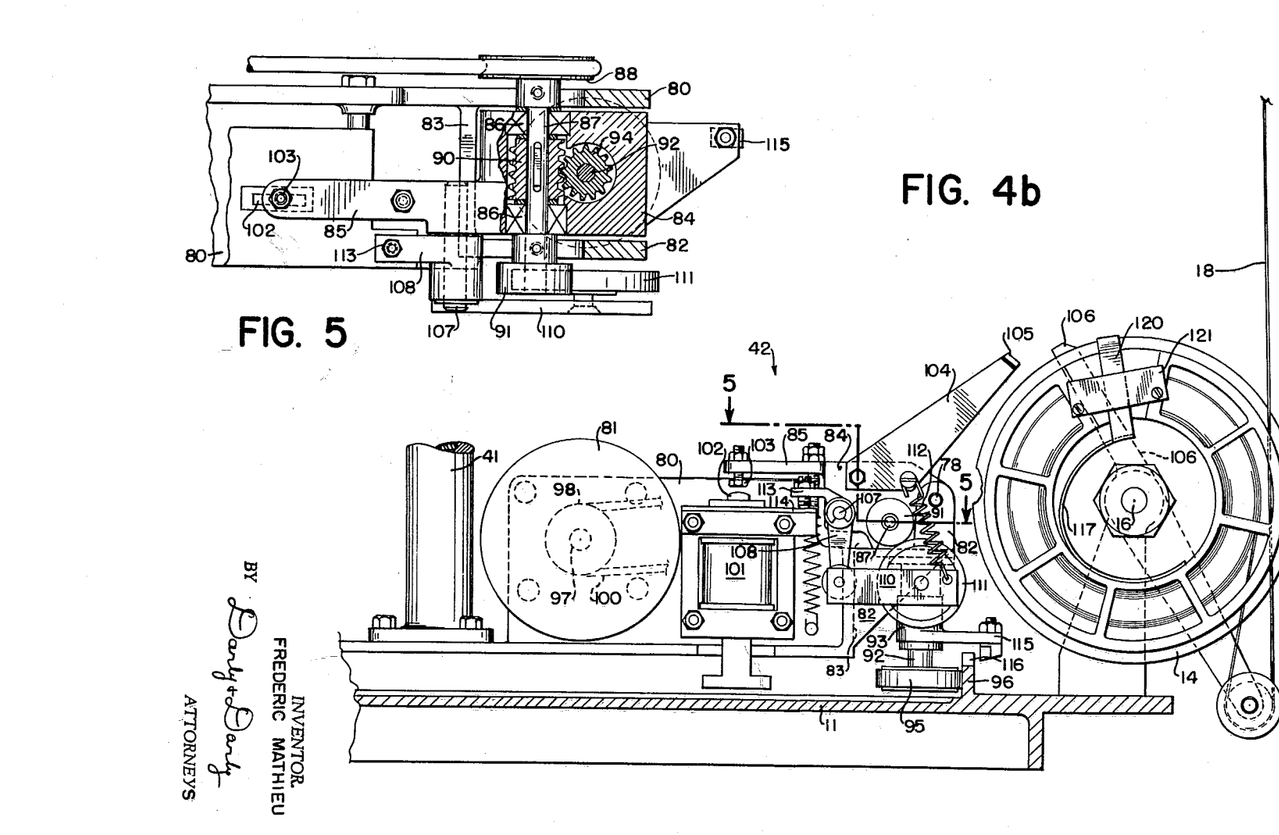
FIGURE 5 is a top plan view of the rewinding mechanism of FIGURES 3b and 4b, this view being partly in section on the plane of the line 5—5 of FIGURE 4b.

Referring now to FIGURES 3b, 4b and 5, the rewinding mechanism comprises a frame member 80 to which is fixed a motor 81. The frame or plate member 80 has a fork formed integrally therewith, the second arm of which is designated 82, this portion 82 being joined to the portion 80 by means of the web 83. Pivotally mounted on a pivot rod 78 extending between the fork elements formed of plate 80 and extension 82 is a block 84 which block has an arm formed integrally therewith extending to the left and designated 85. Mounted in bearings 86 suitably fixed in the block 84 is a shaft 87. Shaft 87 carries at one end a pulley 88, near its center a worm 90 and at its opposite end a roller 91, the pulley 88 and roller 91 being external to the block. Mounted on a vertical shaft 92 suitably journalled in the block 84 and in an auxiliary bearing member 93 is a worm wheel 94 which meshes with the worm 90. Fixed to the shaft 92 at its lower end is a friction roller 95 which cooperates with a flange 96 on the lower drum element or disk 11, the roller serving to drive the rewinding mechanism as a whole when the parts are in the position shown in FIGURE 4b.

As seen particularly in FIGURE 1, the shaft 97 of motor 81 has a pulley 98 mounted thereon, a belt 100 extending over pulleys 98 and 88 to thereby drive the shaft 87 and rollers 91 and 95.

Also mounted upon the frame 80 is a solenoid 101, the plunger 102 of which cooperates with a regulating screw 103 fixed in the arm 85 to thereby cause the block 84 to pivot about the rod 78.

Also mounted on the block 84 is an arm 104 which has a bent over end 105 which cooperates with the upper end of an idler roller support arm 106. An arm 106 is provided for each film supply reel and is mounted for rotation on the reel axis 16 being spring biased, however, to the position shown in FIGURES 3b and 4b.

Pivotally mounted on a pin 107 fixed in the block 84 is a bell crank lever 108. Pivoted on the lower arm of the lever 108 is a link 110 which extends to the right as seen in FIGURE 4b and has rotatably mounted thereon near its right hand end a friction roller 111. A tension spring 112 extends between the right hand end of link 110 and a fixed point on the block 84, the spring thus holding the link upwardly with the roller 111 in engagement with the roller 91. The upper arm of bell crank 108 is provided with an adjustment screw 113 which strikes a plate 114 forming part of the mounting for a solenoid 101, thereby limiting the movement of the bell crank in a clockwise direction.

As will be seen when FIGURES 3b and 4b are compared, operation of solenoid 101 causes the block 84 to pivot about the rod 78 thus disengaging roller 95 from the flange 96 and at the same time causing link 110 to move upwardly while maintaining the rollers 91 and 111 in engagement, thereby causing counterclockwise movement of bell crank 108 placing the roller 111 in engagement with the rim of the film supply reel 14.

It will be noted that a latch member 115 is formed integrally with the bearing member 93 and that this latch cooperates with notches 116 formed in the flange 96 of the disk 11.

Although some minor elements of the mechanism have not yet been described, it is believed that these elements will be clearer and that the correlation of the elements already described as well as of those to be described will be better explained if the operation of the machine is now described in some detail.

In describing the operation we will proceed from the condition depicted in FIGURE 1, namely, that a film is being projected and that that projection has been nearly completed. We will also assume that a film has been selected for the next projection so that the new film will move into position immediately upon the completion of the showing of the old film.

As indicated in FIGURES 3b and 4b, each film reel is provided with a pin (not shown) mounted on a leaf spring member 117 fixed to the inner periphery of the reel 14. This pin (not shown) is, however, exactly similar to the pin 118 of FIGURE 3a for which reason the pin and spring elements and cooperating parts of FIG- URES 3a and 3b, and 4a and 4b have been given like numbers.

A bent over end of spring 117 extends in a direction parallel to the axis of the reel and is then bent radially outwardly to form a trigger finger 120, this finger being guided by means of a guide plate 121 fixed to the outer side of the reel 14 or 15 as the case may be. Pins 118 cooperate with perforations formed in the film so that when the film on any reel has been unwound and there are but a few turns remaining, the pin is permitted to move radially outwardly thereby causing the trigger finger 120 to move outwardly beyond the reel rim and be positioned to engage cooperating elements.

As shown in FIGURE 1, the trigger finger 120 has thus moved outwardly and as the projection continues will operate the lever 122 which will in turn permit microswitch 123 to operate. When microswitch 123 operates it energizes a motor (not shown) which drives the crank arm 38 through one-half of a revolution. This operation causes arm 44 and with it projector part 22 to pivot about the pivot point 23. As this occurs, the trip 47 by virtue of its bent over portion 49 engages the upper surface of the T member 51 near its right hand edge, thereby moving that lever to the position shown in FIGURE 3a. Also, the operation of microswitch 123 results in stoppage of the two drive sprockets 33 and 36 and as the projector parts open the spring bias of arm 106 causes that arm to move downwardly to thereby tighten the film between the upper and lower supply reels.

The movement of the T lever 51 into the FIGURE 3 position causes bell crank 60 to rotate about its pivot point thereby operating microswitches 63 and 64. Microswitch 63 is open when the bell crank is rotated to its extreme clockwise position at which time microswitch 64 is likewise held open. Thus the rotation of the T lever about its pivot and the counterclockwise rotation of bell crank 60 causes both microswitches 63 and 64 to close their contacts. As will be seen by referring to FIGURE 6, when these microswitch contacts close, the solenoid 101 is energized as is the rewinding motor 81. Energization of the solenoid causes the block 84 to pivot about its pivotal axis 78 as has already been described thereby causing the takeup drive roller 111 to engage the rim of the particular takeup reel the film on which has been projected and at the same time causing disengagement of drive roller 95 from flange 96 and engagement of latch 115 with one of the notches 116 of flange 96. As a result of these actions the supply reel now starts to rotate to rewind the tape from the corresponding takeup reel. At the same time movement of arm 104 into the position shown in FIGURE 3b assures that there will be sufficient slack maintained in the film so that it can be properly threaded between the projector parts when next projected.

As the projector part 22 reached its fully open position a microswitch (not shown) was operated which again energized the circuit for the drum drive motor 40 and its cooperating solenoid to cause a latch to be removed from the drum and to cause the driving motor 40 to drive the drum until the next selected film is in the plane of projection. The stopping of the drive motor is brought about by the rotation of a selector arm 19 coupled to the film drum by means of inner shaft 29 which cooperates with a selector mechanism, no detail of which is shown but which is indicated generally at 39, FIGURE 1.

Since at this time the latch 115 of the rewind mechanism is engaged with a notch 116, the rewind mechanism moves with the drum, the rewinding continuing during such movement. Also since, as has been explained, the arm 43 and shaft 41 are fixed to the rewind mechanism, arm 43 will rotate and will move out of the position shown in FIGURE 1 into a position corresponding angularly with the position of the film being rewound. The movement of arm 43 causes the actuator of microswitch 65 to move away from the stop 66 thereby closing its contacts, but without effect at this moment since the circuit to motor 81 and solenoid 101 are already completed through microswitches 63 and 64.

When the drum has rotated sufficiently to place the new selected film in the plane of projection, the crank arm 38 is again caused to rotate through 180° to close the projector, energize the projector lamp 24, initiate the forward drive of the newly selected film, and thus project the film. The rewinding of the old film continues during the early portion of this period and, in fact, until there remains on the takeup reel from which the film is being taken by the rewind, only a few turns of film. At this time, as explained above, a pin 118 which is spring pressed against the film, is able to enter perforations in the film and thus finger 120, in the course of its clockwise rotation as seen in FIGURE 4, strikes bent over L-shaped piece 52 at the end of T lever 51 moving it from the position of FIGURE 3a to that of FIGURE 4a. It will be understood that at the time the projector closed the arm 44 took up the position shown in FIGURE 4a leaving the T lever 51 in the position shown in FIGURE 3a. The movement of the T lever 51 into the position of FIGURE 4a under drive of finger 120 results in clockwise rotation of bell crank 60 about its pivot point and thus in opening of microswitches 63 and 64.

The opening of the two microswitches 63 and 64 results in the deenergization of solenoid 101, but due to the fact that microswitch 65 has closed its contacts, the motor 81 remains energized. The result of the deenergization of solenoid 101 is that the latch 115 disengages from the notch 116 while at the same time the drive roller 111 disengages from the rim of the supply reel being considered. The drive roller 95 then engages the flange 96 on the drum member 11. Motor 81 continues to operate and roller 95 drives the rewind mechanism together with the arm 43 and the shaft 41 in the reverse direction through the angle which these parts traversed while latched to the drum.

As the rewind mechanism arrives in the projection position, the actuator for microswitch 65 engages the stop 66 thereby causing the microswitch contacts to open thus deenergizing the rewind motor 81. The parts are now in the position which is shown in FIGURE 1, and projection of this second selected film continues until it is completed and the microswitch 123 again operated.

Since there may be conditions under which the arm 43 will not return to the projection position until the projection of the following film has been completed which would normally cause opening of the projector and would place the trip 47 in the FIGURE 3 position before the arm returned, means are provided to assure that the opening of the projector does not occur until the arm 43 is in the projection position. This means comprises the microswitch 73 whose contacts are closed only when the arm 43 is in the projection position and which contacts must be closed before the crank arm 38 can operate to open the projector.

So long as selection of a new film is made prior to completion of projection of an old film the cycle just above described will continue. Of course, if no further selection has been made, then the drum will not be driven to a new position and the rewinding will occur while the rewind mechanism is in the projection position.

If, on the other hand, the film selected is the same film which is being projected, then following the opening of the projector at the termination of projection, the drum will be driven, the rewinding mechanism being latched thereto and rotated therewith. In this case, the rewind mechanism including the shaft 41 and arm 43 will rotate through an angle of approximately 355° and until the arm 43 approaches the rear of the stationary projector part 21. As this occurs the cam face 68 will engage the actuator or roller 72 of microswitch 74 and this microswitch will be actuated resulting in breaking of the circuit to the drum drive motor 40. The drum will then be stopped in the 355° position and the rewinding of the film will be completed in this position. When the rewinding is completed, the microswitches 63 and 64 will have their contacts opened as described above and, since the contacts of microswitch 65 will be closed, the rewinding mechanism will return to the projection position.

As soon as the contacts of microswitch 73 are actuated due to the cam on arm 43 arriving in projection position, the drum drive motor 40 will resume operation and will cause the drum to rotate in the same direction as previously through the remaining portion of a 360° angle bringing it into the projection position. At this time projection of the same film will be initiated.

The contacts of microswitch 73 remain open during the entire forward and reverse movement of arm 43 and thus assure that the projector does not open until the arm 43 has reached the projection position. Thus the operability of the T-shaped member 51 by trip 47 when the projector opens is assured. As has previously been explained, when the arm reaches the projection position prior to completion of projection, the opening of the projector is initiated by closing of the contacts of microswitch 123, but when the arm 43 reaches the projection position subsequent to the completion of projection the opening of the projector is delayed until this return occurs.

Many of the mechanisms involved have been described in rather general terms because the detail of their operation is not necessary to an understanding of the present invention. The oscillating mirror, for example, is merely mentioned, it being well known that by use of such a mirror the commonly used intermittent feed of the film may be avoided and the film fed at a constant rate, the mirror serving to properly project the individual frames of the film either directly upon a screen or as shown in FIGURE 1 upon a stationary mirror from which they are reflected upon a screen.

Also, as is apparent from the above, the film may be rewound at substantially the projection speed thus avoiding the wear inherent when a fast rewinding operation is performed.

Although the rewinding mechanism has been described in connection with a rotary magazine, it will be understood that the mechanism may be utilized with magazines having other than rotary movement.

Also, although the portions of the projector mechanism are described as pivotally mounted to provide for opening and closing movement they may obviously be movable to these positions in other manners.

Further, although the arrangement of a sound head for picking up a sound track on the film and energizing an amplifier-loudspeaker system has not been described, it will, however, be understood that such a sound system is present and further that, although only a film system has been described, the sound might be impressed upon a magnetic tape operating synchronously with or attached to the film. Moreover, the device of the present invention might have magnetic tapes substituting for the films throughout and be used solely for the selection of sound tapes or might be arranged to utilize video tapes or combined video sound tapes. These and other modes of projection and reproducing from strips are contemplated and are defined for convenience as reproducing whether the reproduction is of images or sound.

Although I have described preferred embodiments of my invention, it will be understood that I wish to be limited not by the foregoing description, but solely by the claims granted to me.

What is claimed is:

1. In a strip rewinding mechanism for a reproducing machine of the type in which a plurality of film strips, tapes or the like are mounted on a single movable magazine, each strip extending from a supply reel to a takeup reel and in which a strip selected for reproduction is moved relative to a reproducer to a reproducing position by movement of the magazine, the improvement comprising a support mounted for movement along a path parallel and adjacent to the path of movement of the magazine, a rewinding drive means rotatably mounted on said support and selectively engageable with a supply reel, a support positioning means mounted on said support and engageable with the magazine to drive the support relative thereto and a single motor means for driving said rewinding drive means and said support positioning means.

2. In a strip rewinding mechanism for a reproducing machine of the type in which a plurality of film strips, tapes or the like are mounted on a movable magazine, each strip extending from a supply reel to a takeup reel and in which a strip selected for reproduction is moved to a reproducing position by movement of the magazine, the improvement comprising a support mounted for movement along a path parallel and adjacent to the path of movement of the magazine, a rewinding drive means rotatably mounted on said support and engageable with a strip supply reel, a support positioning means mounted on said support and engageable with the magazine to drive the support relative thereto, means for latching said support to the magazine for movement therewith, and a single motor means for driving said rewinding drive means and said support positioning means.

3. In a strip rewinding mechanism for a reproducing machine of the type in which a plurality of film strips, tapes or the like are mounted on a movable magazine, each strip extending from a supply reel to a takeup reel and in which a strip selected for reproduction is moved to a reproducing position by movement of the magazine, the improvement comprising a support mounted for movement along a path parallel and adjacent to the path of movement of the magazine, a drive unit pivotally mounted on said support, said drive unit comprising a rewinding drive roller engageable with a strip reel, a support latch engageable with the magazine to lock the support for movement therewith in a first position of said drive unit and a support positioning drive roller engageable with the magazine in a second position of said drive unit; a single motor for driving said rewinding and positioning rollers and means for pivoting said drive unit to either said first or said second position.

4. In a strip rewinding mechanism for a reproducing machine of the type in which a plurality of film strips, tapes or the like are mounted on a rotatable magazine, each strip extending from a supply reel to a takeup reel and in which a strip selected for reproduction is moved to a reproducing position by rotation of the magazine, the improvement comprising a support mounted for rotary movement about the magazine axis, said support extending to a position adjacent a concentric portion of the magazine, rewinding drive means rotatably mounted on said support and engageable with a supply reel, a support positioning means mounted on said support and engageable with the concentric portion of the magazine to drive the support relative to the magazine, and a single motor means for driving said rewinding drive means and said support positioning means.

5. In a strip rewinding mechanism for a reproducing machine of the type in which a plurality of film strips, tapes or the like are mounted on a rotatable magazine, each strip extending from a supply reel to a takeup reel and in which a strip selected for reproduction is moved to a reproducing position by rotation of the magazine, the improvement comprising a support mounted for rotary movement about the magazine axis, said support extending to a position adjacent a concentric portion of the magazine, rewinding drive means rotatably mounted on said support and engageable with a supply reel, a support positioning means mounted on said support and engageable with the concentric portion of the magazine to drive the support relative to the magazine, means for latching said support to the magazine for movement therewith, and a single motor means for driving said rewinding drive means and said support positioning means.

6. In a strip rewinding mechanism for a reproducing machine of the type in which a plurality of film strips, tapes or the like are mounted on a rotatable magazine, each strip extending from a supply reel to a takeup reel and in which a strip selected for reproduction is moved to a reproducing position by rotation of the magazine, the improvement comprising a support mounted for rotary movement about the magazine axis, said support extending to a position adjacent a concentric portion of the magazine, a drive unit pivotally mounted on said support, said drive unit comprising a rewind drive roller engageable with a strip supply reel, a support latch engageable with the magazine to lock the support for movement therewith in a first position of said drive unit and a support positioning drive roller engageable with the magazine in a second position of said drive roller to drive said support relative to said magazine, a single motor for driving said rewinding and positioning rollers, and means for pivoting said drive unit to either said first or said second position.

7. In a strip rewinding mechanism for a reproducing machine of the type in which a plurality of film strips, tapes or the like are mounted on a rotatable magazine, each strip extending from a supply reel to a takeup reel and in which a strip selected for reproduction is moved to a reproducing position by rotation of the magazine, the improvement comprising, a support rotatably mounted on an axis concentric with the magazine axis, a block mounted on said support for pivotal movement about an axis perpendicular to the support axis, a drive roller mounted on said block for rotation about an axis parallel to the pivotal axis of said block, said drive roller being positioned to engage a supply reel in one pivotal position of said block, a second drive roller also mounted on said block for rotation about an axis substantially parallel to the support axis and engageable with a portion of the magazine in another pivotal position of said block, and a motor mounted on said support, said motor driving both said drive rollers.

8. In a strip rewinding mechanism for a reproducing machine of the type in which a plurality of film strips, tapes or the like are mounted on a rotatable magazine, each strip extending from a supply reel to a takeup reel in which a strip selected for reproduction is moved to a reproducing position by rotation of the magazine, the improvement comprising, a support rotatably mounted on an axis concentric with the magazine axis, a block mounted on said support for pivotal movement about an axis perpendicular to the support axis, a drive roller mounted on said block for rotation about an axis parallel to the pivotal axis of said block, said drive roller being positioned to engage a supply reel in one pivotal position of said block, a second drive roller also mounted on said block for rotation about an axis substantially parallel to the support axis and engageable with a portion of the magazine in another pivotal position of said block, a motor mounted on said support, said motor driving both said drive rollers, and means also mounted on said support for pivoting said block to said first or said second position.

9. In a strip rewinding mechanism for a reproducing machine of the type in which a plurality of film strips, tapes or the like are mounted on a rotatable magazine, each strip extending from a supply reel to a takeup reel and in which a strip selected for reproduction is moved to a reproducing position by rotation of the magazine, the improvement comprising, a support rotatably mounted on an axis concentric with the magazine axis, a block mounted on said support for pivotal movement about an axis perpendicular to the support axis, a shaft journalled in said block, said shaft extending parallel to said pivotal axis, a drive roller mounted on said shaft, an idler roller engaging said drive roller and positioned to engage a supply reel in one pivotal position of said block, a second shaft extending perpendicularly to said first shaft and driven by said first shaft, a support drive roller mounted on said second shaft and positioned to engage with a portion of the magazine in a second pivotal position of said block, a motor mounted on said support, and means coupling said motor to said first shaft to thereby drive said shafts and said rollers.

10. In a strip rewinding mechanism for a producing machine of the type in which a plurality of film strips, tapes or the like are mounted on a rotatable magazine, each strip extending from a supply reel to a takeup reel and in which a strip selected for reproduction is moved to a reproducing position by rotation of the magazine, the improvement comprising, a support rotatably mounted on an axis concentric with the magazine axis, a block mounted on said support for pivotal movement about an axis perpendicular to the support axis, a shaft journalled in said block, said shaft extending parallel to said pivotal axis, a drive roller mounted on said shaft, an idler roller engaging said drive roller and positioned to engage a supply reel in one pivotal position of said block, a second shaft extending perpendicularly to said first shaft and driven by said first shaft, a support drive roller mounted on said second shaft and positioned to engage with a portion of the magazine in a second pivotal position of said block, a motor mounted on said support, means coupling said motor to said first shaft to thereby drive said shafts and said rollers, and means also mounted on said support for causing pivotal movement of said block to said first or said second position.

11. In a strip rewinding mechanism for a reproducing machine of the type in which a plurality of film strips, tapes or the like are mounted on a rotatable magazine, each strip extending from a supply reel to a takeup reel and in which a strip selected for reproduction is moved to a reproducing position by rotation of the magazine, the improvement comprising, a support rotatably mounted on an axis concentric with the magazine axis, a block mounted on said support for pivotal movement about an axis perpendicular to the support axis, a shaft journalled in said block, said shaft extending parallel to said pivotal axis, a drive roller mounted on said shaft, an idler roller engaging said drive roller and positioned to engage a supply reel in one pivotal position of said block, a second shaft extending perpendicularly to said first shaft and driven by said first shaft, a support drive roller mounted on said second shaft and positioned to engage with a portion of the magazine in a second pivotal position of said block, a motor mounted on said support, means coupling said motor to said first shaft to thereby drive said shafts and of said rollers, and a solenoid mounted on said support, said solenoid having a plunger thereof of engaging a portion of said block to thereby move said block to one pivotal position when energized and to restore it to the other pivotal position when deenergized.

12. In a strip rewinding mechanism for a reproducing machine of the type in which a plurality of film strips, tapes or the like are mounted on a rotatable magazine, each strip extending from a supply reel to a takeup reel and in which a strip selected for reproduction is moved to a reproducing position by rotation of the magazine, the improvement comprising, a support rotatably mounted on an axis concentric with the magazine axis, a block mounted on said support for pivotal movement about an axis perpendicular to the support axis, a shaft journalled in said block, said shaft extending parallel to said pivotal axis, a drive roller mounted on said shaft, an idler roller engaging said drive roller and positioned to engage a supply reel in one pivotal position of said block, a latch member mounted on said block and adapted to engage said magazine in said one pivotal position of said block, a second shaft extending perpendicularly to said first shaft and driven by said first shaft, a support drive roller mounted on said second shaft and positioned to engage with a portion of the magazine in a second pivotal position of said block, a motor mounted on said support, means coupling said motor to said first shaft to thereby drive said shafts and of said rollers, and a solenoid mounted on said support, said solenoid having a plunger thereof engaging a portion of said block to thereby move said block to one pivotal position when energized to thereby engage said latch with the magazine and said supply reel idler roller with a supply reel and when deenergized to restore the block to the other piovtal position to disengage said latch from the magazine and to engage said support drive roller with the magazine.

13. A strip rewinding mechanism for a reproducing machine of the type in which a plurality of film strips, tapes or the like are mounted on a movable magazine, each strip extending from a supply reel to a takeup reel and in which a strip selected for reproduction is moved to a reproducing position by movement of the magazine, said rewinding mechanism comprising, in combination; a support movable along a path of movement contiguous to the path of movement of the magazine; a motor mounted on said support; a supply reel driving means mounted on said support and coupled to said motor for drive thereby; means on said support for driving said support along said contiguous path in a direction opposite to that of the magazine in its movement, said support drive means being coupled to said motor for drive thereby; means mounted on said support for latching said mounting means to the magazine for movement therewith; control means also mounted on said support for normally holding said latching means out of engagement with the magazine, said support drive means in engagement with the magazine, and said supply reel driving means out of engagement; said control means when actuated causing said latching means to engage the magazine, the supply reel drive to engage a supply reel at the reproducing position, and the support drive means to disengage; means operable upon completion of reproduction to actuate said first control means and to energize said motor to thereby rewind the reproduced strip on its supply reel while that strip is moving away from reproducing position; means operable upon completion of rewinding to release said control means to cause disengagement of said latching means and engagement of said support drive means to thereby drive said support to reproducing position; and means operable to deenergize said motor when said support and the elements mounted thereon return to reproducing position.

14. A strip rewinding mechanism for a reproducing machine of the type in which a plurality of film strips, tapes or the like are mounted on a movable magazine, each strip extending from a supply reel to a takeup reel and in which a strip selected for reproduction is moved to a reproducing position by movement of the magazine, said rewinding mechanism comprising, in combination; a support movable along a path of movement contiguous to the path of movement of the magazine; a motor mounted on said support; a supply reel driving means mounted on said support and coupled to said motor for drive thereby; means on said support for driving said support along said contiguous path in a direction opposite to that of the magazine in its movement, said support drive means being coupled to said motor for drive thereby; means mounted on said support for latching said mounting means to the magazine for movement therewith; control means also mounted on said support for normally holding said latching means out of engagement with the magazine, said support drive means in engagement with the magazine, and said supply reel driving means out of engagement; said control means when actuated causing said latching means to engage the magazine, the supply reel drive to engage a supply reel at the reproducing position, and the support drive means to disengage; a control arm mounted for movement with said support, said control arm being normally located at the reproduction position, means located at reproduction position operable upon completion of reproduction to actuate said control means and to energize said motor to thereby rewind a reproduced strip on its supply reel while that strip is moving away from reproducing position, means mounted upon said control arm operable upon completion of rewinding to release said control means to cause disengagement of said latching means and engagement of said support drive means to thereby drive said support to reproducing position, and means also mounted on said control arm and operable when said control arm returns to normal position to deenergize said motor.

15. A strip rewinding mechanism for a reproducing machine of the type in which a plurality of film strips, tapes or the like are mounted on a rotatable magazine, each strip extending from a supply reel to a takeup reel and in which a strip selected for reproducing is moved to a reproducing position by rotation of the magazine, said rewinding mechanism comprising, in combination; a support movable along a path of movement concentric to the path of movement of the magazine; a motor mounted on said support; a supply reel driving means mounted on said support and coupled to said motor for drive thereby; means on said support for driving said support along said concentric path in a direction opposite to that of the magazine in its selecting movement, said support drive means being coupled to said motor for drive thereby; means mounted on said support for latching said mounting means to the magazine for movement therewith; control means also mounted on said support for normally holding said latching means out of engagement with the magazine, said support drive means in engagement with the magazine, and said supply reel driving means out of engagement; said control means when actuated causing said latching means to engage the magazine, the supply reel drive to engage a supply reel at the reproducing position, and the support drive means to disengage; means operable upon completion of reproduction to actuate said first control means and to energize said motor to thereby rewind the reproduced strip on its supply reel while that strip is moving away from reproducing position; means operable upon completion of rewinding to release said control means to cause disengagement of said latching means, and engagement of said support drive means to thereby drive said support to reproducing position; and means operable to deenergize said motor when said support and the elements mounted thereon return to reproducing position.

16. A strip rewinding mechanism for a reproducing machine of the type in which a plurality of film strips, tapes or the like are mounted on a rotatable magazine, each strip extending from a supply reel to a takeup reel and in which a strip selected for reproducing is moved to a reproducing position by rotation of the magazine, said rewinding mechanism comprising, in combination; a support movable along a path of movement concentric to the path of movement of the magazine; a motor mounted on said support; a supply reel driving means mounted on said support and coupled to said motor for drive thereby; means on said support for driving said support along said concentric path in a direction opposite to that of the magazine in its selecting movement, said support drive means being coupled to said motor for drive thereby; means mounted on said support for latching said mounting means to the magazine for movement therewith; control means also mounted on said support for normally holding said latching means out of engagement with the magazine, said support drive means in engagement with the magazine, and said supply reel driving means out of engagement; said control means when actuated causing said latching means to engage the magazine, the supply reel drive to engage a supply reel at the reproducing position, and the support drive means to disengage; a control arm mounted for movement with said support, said control arm being normally located at the reproduction position, means located at reproduction position operable upon completion of reproduction to actuate said first control means and to energize said motor to thereby rewind a reproduced strip on its supply reel while that strip is moving away from reproducing position, means mounted upon said control arm operable upon completion of rewinding to release said control means to cause disengagement of said latching means and engagement of said support drive means to thereby drive said support to reproducing position, and means also mounted on said control arm and operable when said control arm returns to normal position to deenergize said motor.

17. In a reproducing machine of the type in which a plurality of film strips, tapes or the like are mounted on a movable magazine, each strip extending from a supply reel to a takeup reel through a reproducing device which is formed in two parts arranged to move relative to each other to open or closed position and in which a strip selected for reproduction is moved to reproducing position by movement of the magazine, in combination; a support mounted for movement along a path parallel and contiguous to the path of movement of the magazine, a rewinding mechanism fixed to said support and engageable with a supply reel to rewind a reproduced strip, an arm mounted for movement with the movable part of the reproducing device, a control arm fixed to said support for movement therewith, a trigger on said control arm, means fixedly mounted at the reproducing position for causing said reproducing device to open upon completion of reproduction of a selected strip, means operated by the reproducing device arm to operate said trigger as the device opens, means operated by said trigger to initiate rewinding movement of said rewind mechanism to engage said mechanism with the supply reel and to latch said support and said control arm to the magazine for movement therewith, means actuated when the takeup reel of the selected strip is emptied to a predetermined extent to restore said trigger to its original position to thereby disengage said rewinding mechanism from the supply reel and initiate return movement of said support and control arm to reproducing position and means also mounted on said control arm for terminating movement of said support and control arm when said support has returned to reproducing position.

18. In a reproducing machine of the type in which a plurality of film strips, tapes or the like are mounted on a movable magazine, each strip extending from a supply reel to a takeup reel through a reproducing device which is formed in two parts arranged to move relative to each other to open or closed position and in which a strip selected for reproduction is moved to reproducing position by movement of the magazine, in combination; a support mounted for movement along a path parallel and contiguous to the path of movement of the magazine, a rewinding mechanism fixed to said support and engageable with a supply reel to rewind a reproduced strip, an arm mounted for movement with the movable part of the reproducing device, a control arm fixed to said support for movement therewith, a trigger on said control arm, means fixedly mounted at the reproducing position for causing said device to open upon completion of reproduction of a selected strip, means operated by the device arm to operate said trigger as the device opens, means operated by said trigger to initiate rewinding movement of said rewind mechanism to engage said mechanism with the supply reel and to latch said support and said control arm to the magazine for movement therewith, means actuated when the takeup reel of the selected strip is emptied to a predetermined extent to restore said trigger to its original position to thereby disengage said rewinding mechanism from the supply reel and initiate return movement of said support and control arm to reproducing position, means also mounted on said control arm for terminating movement of said support and control arm when said support has returned to reproducing position, and means also mounted on said control arm to delay opening of the reproducer following a succeeding reproduction until said support and control arm have reached reproducing position and said trigger is thereby again positioned to be acted upon by the projector arm.

19. A reproducing machine as claimed in claim 18 wherein means are provided on said control arm to interrupt the movement of the magazine when the same film strip is selected for a succeeding reproduction, said interrupting means terminating the interruption when rewinding is completed and said control arm is returned to reproducing position.

References Cited by the Examiner

UNITED STATES PATENTS

| 2,290,071 | 7/42 | Rinaldy | 88—17 |
| 2,821,576 | 1/58 | Gaubert. | |
| 3,041,925 | 7/62 | Bavaro | 274—4 X |
| 3,041,926 | 7/62 | Granelli | 88—17 |

MERVIN STEIN, *Primary Examiner.*

HARRISON R. MOSELEY, *Examiner.*